(12) United States Patent
Yoshida et al.

(10) Patent No.: US 7,816,806 B2
(45) Date of Patent: Oct. 19, 2010

(54) POWER SUPPLY DEVICE

(75) Inventors: Koji Yoshida, Nara (JP); Hiroyuki Handa, Osaka (JP); Mitsuhiro Matsuo, Osaka (JP)

(73) Assignee: Panasonic Corporation, Osaka (JP)

( * ) Notice: Subject to any disclaimer, the term of this patent is extended or adjusted under 35 U.S.C. 154(b) by 134 days.

(21) Appl. No.: 12/375,153

(22) PCT Filed: Jul. 20, 2007

(86) PCT No.: PCT/JP2007/064333
§ 371 (c)(1),
(2), (4) Date: Jan. 26, 2009

(87) PCT Pub. No.: WO2008/018282
PCT Pub. Date: Feb. 14, 2008

(65) Prior Publication Data
US 2009/0236915 A1 Sep. 24, 2009

(30) Foreign Application Priority Data
Aug. 8, 2006 (JP) .............................. 2006-215305

(51) Int. Cl.
*B60R 22/00* (2006.01)
(52) U.S. Cl. ..................................... 307/10.6
(58) Field of Classification Search ................. 307/10.6
See application file for complete search history.

(56) References Cited

U.S. PATENT DOCUMENTS 7,336,002 B2 * 2/2008 Kato et al. ................. 307/10.6

FOREIGN PATENT DOCUMENTS

| JP | 50-93210 | 8/1975 |
| JP | 2001-136735 A | 5/2001 |
| JP | 2002-218667 A | 8/2002 |

OTHER PUBLICATIONS

International Search Report for PCT/JP2007/064333.

* cited by examiner

*Primary Examiner*—Robert L. Deberadinis
(74) *Attorney, Agent, or Firm*—Pearne & Gordon LLP

(57) ABSTRACT

A power supply device of the present invention includes a switching element and a switch that operate so that when a primary DC voltage source of the device is in a voltage drop state, the power of a secondary auxiliary voltage source thereof is mixed with the power of the DC voltage source in a balanced manner and supplied to a load. This structure can reduce the maxim amount of power storage necessary for the auxiliary voltage source and thus the number of power storage elements necessary for the auxiliary voltage source. Thus, a smaller power supply device can be provided.

2 Claims, 3 Drawing Sheets

POWER SUPPLY DEVICE

This Application is a U.S. National Phase Application of PCT International Application PCT/JP07/064333.

Technical Field

The present invention relates to a power supply device in which voltage fluctuations of a direct-current (DC) voltage source thereof is compensated for.

Background Art

In order to protect global environment, idling stop, electrically-driven power steering, and electrically-driven turbo systems have been developed in recent years from the viewpoint of improving fuel efficiency particularly in vehicles. When one of a starter, steering motor, and turbo motor is operated in these systems, a large current on the order of 100 A is consumed, thus causing a voltage drop in the DC voltage source made of batteries. A large voltage drop hinders proper operation of such a load to which the DC voltage source supplies power.

A power supply device is devised as a method of preventing the influence of such temporary voltage fluctuations of the DC voltage source on the load. For instance, in this power supply device, an auxiliary voltage source is connected in series with the DC voltage source, and the power from the auxiliary voltage source is supplied to the load via a DC/DC converter, at voltage drop. The structure proposed in Patent Document 1 can be applied to the structure of such a power supply device. In the circuit structure of Patent Document 1, in order to supply power to both of a 14-V load and a 42-V load, two types of power supplies, i.e. a DC voltage source and an auxiliary voltage source, are connected in series, and a DC/DC converter transfers power between both voltage sources. When this circuit structure is used to prevent the influence of temporary voltage fluctuations of the DC voltage source on the load as described above, the circuit structure is as shown in FIG. 4.

With reference to FIG. 4, auxiliary voltage source 103 is connected in series with DC voltage source 101 made of batteries. Usable for auxiliary voltage source 103 is a power storage element made of a high-capacity electric double-layer capacitor, a secondary battery, or the like. To load 105, DC voltage source 101 is coupled via diode 107. Auxiliary voltage source 103 is also coupled to the load via two-way DC/DC converter 109. Diode 107 works to block the output of two-way DC/DC converter 109 from flowing back into DC voltage source 101.

The detailed structure of two-way converter 109 is as follows. First switching element 111 and second switching element 113 are connected in series with one end of auxiliary voltage source 103. The other end of second switching element 113 is connected to the negative terminal of DC voltage source 101. One end of inductance element 115 is connected to the junction point between first switching element 111 and second switching element 113. The other end of inductance element 115 is connected to load 105.

First switching element 111 and second switching element 113 are controlled by control circuit 117 so that one of the first and second switching elements is alternately switched on. Control circuit 117 also controls auxiliary voltage source selector switch 119 that switches charging into auxiliary voltage source 103 and discharging therefrom in response to a signal from the external electronic control unit (hereinafter abbreviated as the external ECU, not shown) of a vehicle.

Connected to the discharge side terminal of auxiliary voltage source selector switch 119 is first error detection amplifier 121 that outputs the difference between a voltage of load 105 and a predetermined voltage to be supplied to load 105. On the other hand, second error detection amplifier 123 that outputs the difference between a voltage of auxiliary voltage source 103 and a predetermined voltage to which auxiliary voltage source 103 is to be charged is connected to the charge side terminal of auxiliary voltage source selector switch 119.

Next, a description is provided of the operation of such a power supply device. First, when the ignition switch (not shown) of the vehicle is turned on, the external ECU transmits a charging signal to control circuit 117 so that auxiliary voltage source 103 is charged. In response to this signal, control circuit 117 switches auxiliary voltage source selector switch 119 to the charge side. As a result, two-way DC/DC converter 109 starts to charge the power of DC voltage source 101 to auxiliary voltage source 103. When the charging makes voltage VC of auxiliary voltage source 103 equal to the predetermined voltage of second error detection amplifier 123, the converter operates to keep the charged voltage.

Next, assume that the above-mentioned system that consumes large current operates, as load 105. At this time, a discharging signal is transmitted to control circuit 117 from the external ECU. Then, control circuit 117 switches auxiliary voltage source selector switch 119 to the discharge side. As a result, two-way DC/DC converter 109 outputs a voltage to load 105 so that the voltage is equal to the predetermined voltage of first error detection amplifier 121. With this structure, even when a large current consumption changes voltage VB of DC voltage source 101 from a normal voltage state to a voltage drop state, voltage VL of load 105 is kept substantially equal to the voltage in the normal voltage state. Thus, load 105 can keep normal operation. At this time, VL>VB, and thus diode 107 blocks the power of two-way DC/DC converter 109 from flowing back into DC voltage source 101.

Next, after the completion of the large current consumption, voltage VB of DC voltage source 101 is returned to the normal voltage state. At this time, the external ECU transmits a charging signal to control circuit 117. In response to this signal, control circuit 117 switches auxiliary voltage source selector switch 119 to the charge side so that the power supplied from auxiliary voltage source 103 to load 105 during the large current consumption is recharged to auxiliary voltage source 103. Thus, auxiliary voltage source 103 is fully charged.

Repeating such operations allows the supply of stable voltage to load 105 and thus the stable operation of load 105, even at large current consumption.

Such a conventional power supply device is capable of supplying a stable voltage to a load even when the voltage of DC voltage source 101 fluctuates. However, there is a problem that a large number of high-capacity power storage elements are required to supply power to load 105 in a voltage drop state of DC voltage source 101. This problem is described with reference to FIG. 5.

FIG. 5 is a diagram showing a change of voltage V1 with time at the junction point between first switching element 111 and second switching element 113 in two-way DC/DC converter 109. The abscissa axis shows time t; the ordinate axis shows voltage V1. In FIG. 5, when voltage V1 is equal to VB+VC, first switching element 111 is switched on. When voltage V1 is equal to 0, second switching element 113 is switched on. Voltage VL is supplied as a voltage obtained by smoothing voltage V1 using inductance element 115. Therefore, when the ratio of switching on first switching element 111 in one on/off cycle (hereinafter referred to as an on/off ratio) is indicated as D, output voltage VL of two-way DC/DC converter 109 is given by the following equation:

$$VL = D \times (VB+VC) + (1-D) \times 0 = D \times (VB+VC) \tag{1}$$

Voltage VL required by load 105 is a fixed value. Thus, the above equation shows that, in order to provide a necessary voltage when voltage VB of DC voltage source 101 drops, on/off ratio D needs to be increased. As a result, the time period during which power is supplied from auxiliary voltage source 103 to load 105 is increased. This necessitates a larger number of high-capacity power storage elements. For this reason, in the conventional structure, a large number of power storage elements increase the size of the power supply device.

[Patent Document 1] Japanese Patent Unexamined Publication No. 2002-218667

SUMMARY OF THE INVENTION

A power supply device includes a second switching element coupled between an inductance element and the positive terminal of a DC voltage source. With this structure, voltage V1 at the junction point between a first switching element and the second switching element is VB instead of 0, and thus on/off ratio D can be reduced. As a result, the number of power storage elements necessary for an auxiliary voltage source thereof can be reduced. In this power supply device, when the second switching element is switched on in a voltage drop state of the DC voltage source, voltage VB, which is dropped but not equal to 0, is fed into a two-way DC/DC converter. This structure can reduce the number of power storage elements necessary for the auxiliary voltage source and provide a smaller power supply device.

REFERENCE MARKS IN THE DRAWINGS

Figure 1:
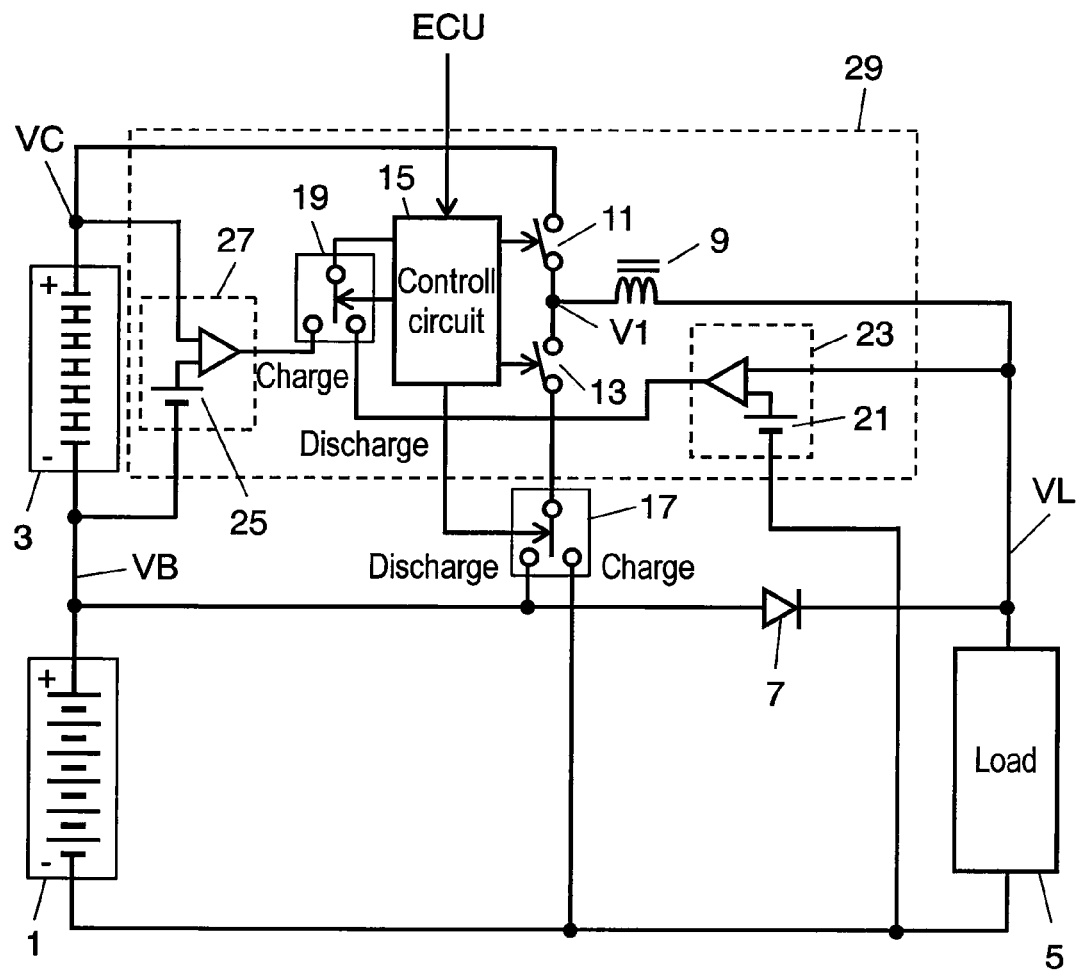
FIG. 1 is a block circuit diagram of a power supply device in accordance with a first exemplary embodiment of the present invention.

1 Direct-current (DC) voltage source
3 Auxiliary voltage source
5 Load
9 Inductance element
11 First switching element
13 Second switching element
15 Control circuit
17 Selector switch
19 Auxiliary power source selector switch
31 Switch
33 Third switching element

DETAILED DESCRIPTION OF PREFERRED EMBODIMENTS

Hereinafter, a description is provided of exemplary embodiments of the present invention, with reference to the accompanying drawings. Herein, a description is provided of a structure in which a voltage conversion is performed by a two-way DC/DC converter on the power from a direct current (DC) voltage source and an auxiliary voltage source and the power is supplied to a load, when the voltage of the DC voltage source is dropped by such an operation of driving the starter of a vehicle.

First Exemplary Embodiment

Figure 2:
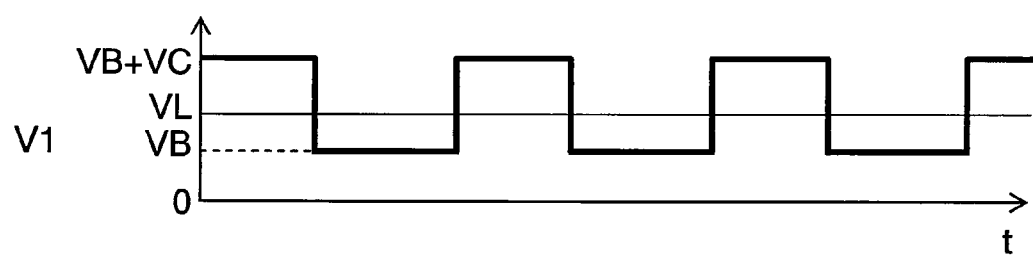
FIG. 2 is a timing chart showing an operation of the power supply device in accordance with the first exemplary embodiment of the present invention.

FIG. 1 is a block circuit diagram of a power supply device in accordance with the first exemplary embodiment of the present invention. FIG. 2 is a timing chart, i.e. a diagram showing a change of voltage V1 with time in the power supply device in accordance with the first exemplary embodiment of the present invention.

With reference to FIG. 1, auxiliary voltage source 3 is connected in series with DC voltage source 1 made of batteries. Used for auxiliary voltage source 3 is a power storage element made of a high-capacity electric double-layer capacitor particularly excellent in rapid charge/discharge characteristics. Load 5 that consumes power is coupled to the junction point between DC voltage source 1 and auxiliary voltage source 3, via diode 7. To one end of load 5, inductance element 9 is connected. Inductance element 9 works to smooth the power to be supplied to load 5.

First switching element 11 is connected to the other end of inductance element 9 and to one end (the positive side in FIG. 1) of auxiliary voltage source 3. First switching element 11 intermittently applies the total voltage of DC voltage source 1 and auxiliary voltage source 3 to inductance element 9 by repeating on/off operation. On the other hand, second switching element 13 is coupled to the other end of inductance element 9 and to the other end (negative side in FIG. 1) of auxiliary voltage source 3 via selector switch 17. Second switching element 13 intermittently applies the voltage of DC voltage source 1 to inductance element 9 by repeating on/off operation. First switching element 11 and second switching element 13 repeat on/off operation such that one of the first and second switching elements is alternately switched on.

An on/off ratio between first switching element 11 and second switching element 13 of D is controlled by control circuit 15. Thus, the power to be supplied to load 5 can be controlled.

Also connected to the above structure is selector switch 17 that switches the coupling of second switching element 13 to DC voltage source 1 so that the second switching element is coupled to either positive terminal or negative terminal of DC voltage source 1. Control circuit 15 controls the switching of selector switch 17. Selector switch 17 is switched to the negative terminal side during charging of auxiliary voltage source 3, and to the positive terminal side during discharging from auxiliary voltage source 3.

Control circuit 15 also controls auxiliary voltage source selector switch 19 that switches charging into auxiliary voltage source 3 and discharging therefrom, in response to a signal from the external ECU (not shown). Connected to the discharge side terminal of auxiliary voltage source selector switch 19 is first error detection amplifier 23 that outputs the difference between a voltage of load 5 and first predetermined voltage 21 to be supplied to load 5. Connected to the charge side terminal of auxiliary voltage source selector switch 19 is second error detection amplifier 27 that outputs the difference between a voltage of auxiliary voltage source 3 and second predetermined voltage 25 to which auxiliary voltage source 3 is to be charged.

In this manner, inductance element 9, first switching element 11, second switching element 13, control circuit 15, auxiliary voltage source selector switch 19, first error detection amplifier 23, and second error detection amplifier 27 constitute two-way DC/DC converter 29.

Next, a description is provided of the operation of such a power supply device. First, when the ignition switch (not shown) of the vehicle is turned on, the external ECU transmits a charging signal to control circuit 15 so that auxiliary voltage source 3 is charged. In response to this signal, control circuit 15 switches selector switch 17 and auxiliary voltage source selector switch 19 to the corresponding charge sides. As a result, two-way DC/DC converter 29 operates as an inverting DC/DC converter in which voltage VB of DC voltage source 1 is inverted with respect to the positive terminal of DC voltage source 1 so that auxiliary voltage source 3 connected in series with DC voltage source 1 is charged. Thus, two-way DC/DC converter 29 starts to charge auxiliary voltage source 3 using the power of DC voltage source 1. When the charging makes voltage VC of auxiliary voltage source 3 equal to second predetermined voltage 25 of second error detection amplifier 27, the converter operates to keep the charged voltage. The operations up to this step are the same as those in the conventional structure.

Next, assume that the starter or another system that consumes large current operates, as load 5. At this time, a discharging signal is transmitted to control circuit 15 from the external ECU. Then, control circuit 15 switches selector switch 17 and auxiliary voltage source selector switch 19 to the corresponding discharge sides. As a result, two-way DC/DC converter 29 outputs a voltage to load 5 so that the voltage is equal to second predetermined voltage 21 of first error detection amplifier 23. With this structure, even when a large current consumption changes voltage VB of DC voltage source 1 from a normal voltage state to a voltage drop state, voltage VL of load 5 is kept substantially equal to the voltage in the normal voltage state. Thus, load 5 can keep normal operation. At this time, VL>VB, and thus diode 7 blocks the power of two-way DC/DC converter 29 from flowing back into DC voltage source 1.

Herein, the normal voltage refers to a voltage range covering fluctuations approximately 10% of the rated output voltage of DC voltage source 1. More specifically, when the rated output voltage of DC voltage source 1 is 12V, voltages equal to or higher than approximately 11V are referred to as a normal voltage state, and voltages lower than approximately 11V are referred to as a voltage drop state. In the normal voltage state, abnormal voltage seldom causes malfunction of the load. In the voltage drop state, abnormal voltage can cause malfunction of the load.

Figure 4:
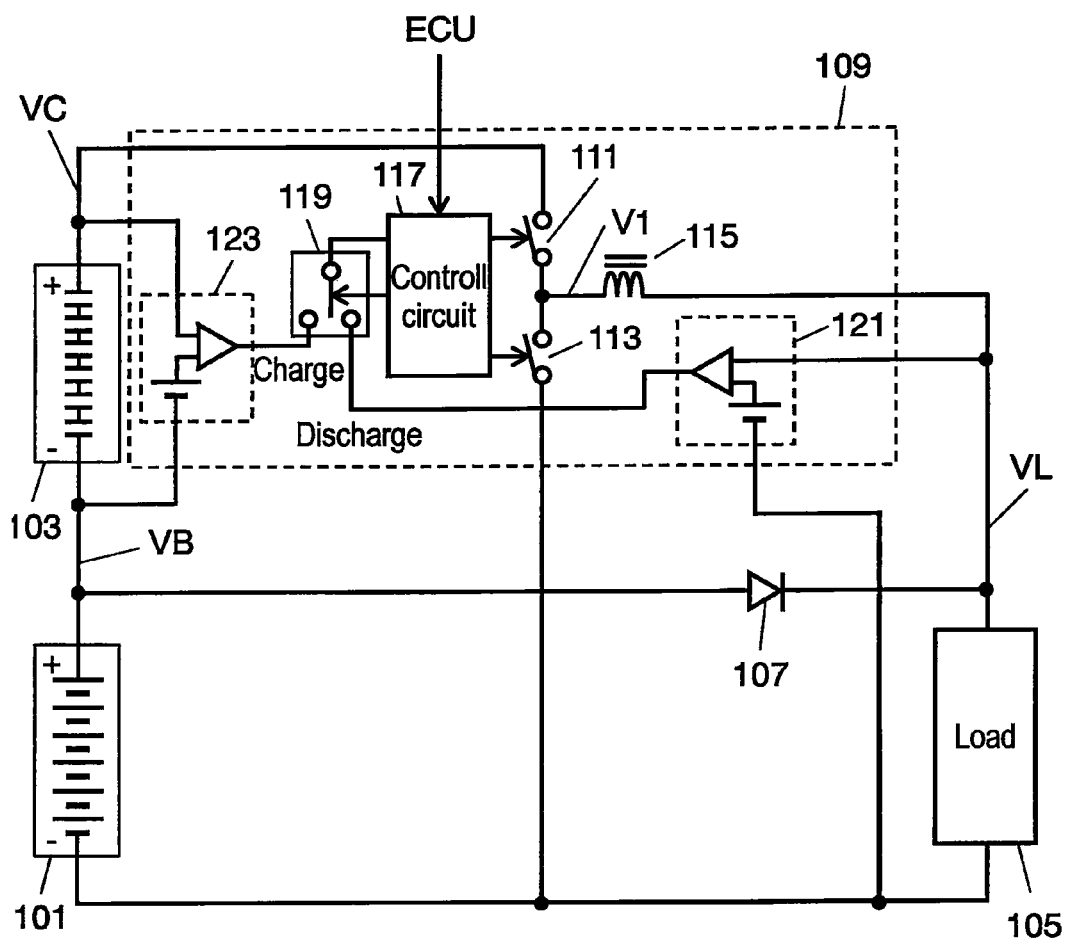
FIG. 4 is a block circuit diagram of a conventional power supply device.

FIG. 2 is a diagram showing a change of voltage V1 with time at the junction point between first switching element 11 and second switching element 13 in two-way DC/DC converter 29, that is, a timing chart thereof. The abscissa axis shows time t; the ordinate axis shows voltage V1. In FIG. 2, when voltage V1 is equal to VB+VC, first switching element 11 is switched on. When voltage V1 is equal to VB, second switching element 13 is switched on. In the conventional structure, as obvious from the circuit diagram of FIG. 4, second switching element 113 is fixedly connected to the negative terminal of DC voltage source 101. Thus, when second switching element 113 is switched on, voltage V1=0. On the other hand, in the first exemplary embodiment, second switching element 13 is coupled to the positive terminal of DC voltage source 1 via selector switch 17 at discharging. Thus, voltage V1=VB. Voltage VL is a value obtained by smoothing voltage V1 using inductance element 9. Therefore, when the on/off ratio is indicated as D1, output voltage VL of two-way DC/DC converter 29 is given by the following equation:

$$VL = D1 \times (VB+VC) + (1-D1) \times VB = VB + D1 \times VC \quad (2)$$

Figure 5:
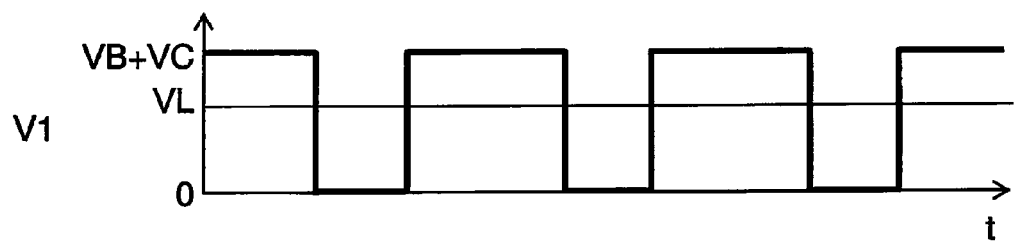
FIG. 5 is a timing chart showing an operation of the conventional power supply device.

Voltage VL required by load 5 is a fixed value. Thus, the comparison between the following two diagrams shows that the time period (the width of the rectangular pulses in FIG. 2) during which first switching element 11 is switched on to supply the required voltage is shorter than that of the conventional structure in FIG. 5. This comparison is shown by equations as follows.

According to Equation (1), on/off ratio D of the conventional structure is given by the following equation:

$$D = VL/(VB+VC) \quad (3)$$

On the other hand, according to Equation (2), on/off ratio D1 of the first exemplary embodiment is given by the following equation:

$$D1 = (VL-VB)/VC \quad (4)$$

Therefore, when the difference between on/off ratio D and on/off ratio D1 is indicated as ΔD, and Equation (4) is subtracted from Equation (3), the following equation is obtained.

$$\Delta D = VL/(VB+VC) - (VL-VB)/VC = VB(VB+VC-VL)/(VC(VB+VC)) \quad (5)$$

In Equation (5), because VB+VC>VL according to FIG. 2, VB+VC−VL>0. The other terms are also positive. Thus, difference in on/off ratio ΔD=(D−D1)>0. This result shows on/off ratio D1 of the first exemplary is smaller. The on/off ratio is a ratio of the time period during which the total voltage of DC voltage source 1 and auxiliary voltage source 3 is supplied. Thus, at a smaller off/off ratio, smaller power is supplied from auxiliary voltage source 3. Therefore, the power supply device of the first exemplary embodiment requires a smaller number of power storage elements in auxiliary voltage source 3, and can be made smaller in size than the conventional structure. More specifically, when VB=9V, VC=5V, and VL=12V, for instance, on/off ratio D=0.875 and on/off ratio D1=0.6 according to Equations (3) and (4). Thus, on/off ratio D1 of the first exemplary embodiment is approximately 30% smaller than on/off ratio D of the conventional structure. As a result, as described above, the auxiliary voltage source of the first exemplary embodiment can be made approximately 30% smaller in size than that of the conventional structure.

In this manner, power is supplied from DC voltage source 1 even when second switching element 13 is switched on. This structure can reduce the power to be supplied from auxiliary voltage source 3. As a result, this structure can reduce the number of power storage elements and thus the size of the power supply device.

Next, after the completion of the large current consumption, voltage VB of DC voltage source 1 is returned to the normal voltage state. At this time, the external ECU transmits a charging signal to control circuit 15. In response to this signal, control circuit 15 switches selector switch 17 and auxiliary voltage source selector switch 19 to the corresponding charge sides so that the power supplied from auxiliary voltage source 3 to load 5 during the large current consumption is recharged to auxiliary voltage source 3. Thus, auxiliary voltage source 3 is fully charged.

In this manner, even when DC voltage source 1 operates to intermittently repeat the normal voltage state and the voltage drop state, the above charge/discharge operations repeated by two-way DC/DC converter 29 and auxiliary voltage source 3 allow the supply of stable voltage to load 5 and the stable operation of load 5.

The above operations are summarized. First, when DC voltage source 1 is in the normal voltage state, DC voltage source 1 supplies power directly to load 5. At this time, control circuit 15 switches selector switch 17 to the negative terminal side of DC voltage source 1 and switches auxiliary voltage source selector switch 19 to the side of second error detection amplifier 27. Thereby, the power of DC voltage source 1 is charged to auxiliary voltage source 3 through inductance element 9, first switching element 11, and second switching element 13. Next, when DC voltage source 1 is brought into the voltage drop state by the large current consumption of the starter or the like, control circuit 15 switches selector switch 17 to the positive terminal side of DC voltage source 1. Thereby, power is supplied to load 5. With these operations, even when DC voltage source 1 intermittently repeats the normal voltage state and the voltage drop state, load 5 can keep the stable operation.

The above structure and operations can reduce the number of power storage elements in the auxiliary voltage source and thus the size of the power supply device.

In the first exemplary embodiment, two-way DC/DC converter 29 is used to charge auxiliary voltage source 3. However, auxiliary voltage source 3 can be charged by another means. For instance, a buck DC/DC converter having a simpler structure than two-way DC/DC converter 29 can be used. Specifically, in FIG. 1, selector switch 17, auxiliary voltage source selector switch 19, and second error detection amplifier 27 are eliminated, and second switching element 13 is connected between first switching element 11 and the negative electrode (negative side in FIG. 1) of auxiliary voltage source 3. Also in this case, when second switching element 13 is switched on, voltage V1=VB. This structure can reduce on/off ratio D1 and the number of power storage elements, and thus the size of the power supply device. Because the buck DC/DC converter is a one-way DC/DC converter, second switching element 13 can be made of a rectifier.

Second Exemplary Embodiment

Figure 3:
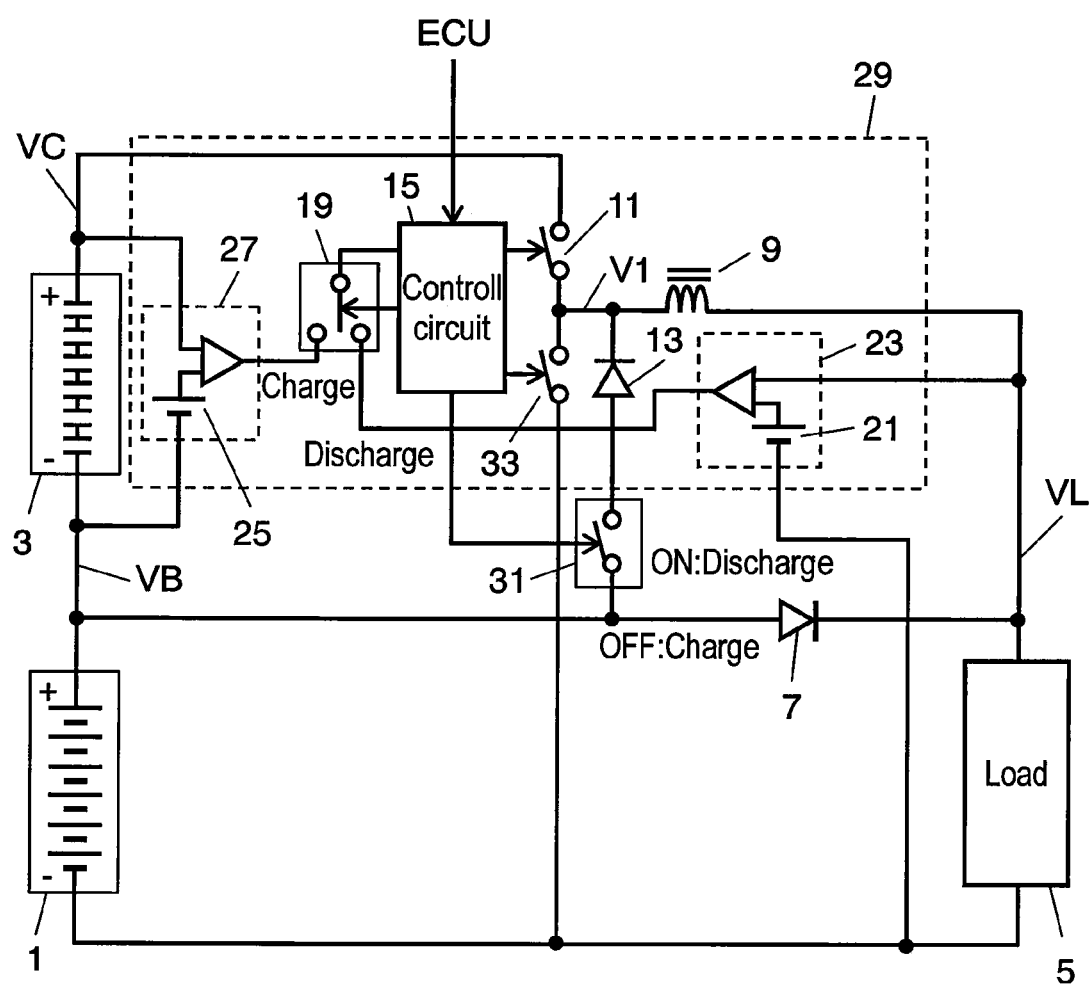
FIG. 3 is a block circuit diagram of a power supply device in accordance with a second exemplary embodiment of the present invention.

FIG. 3 is a block circuit diagram of a power supply device in accordance with the second exemplary embodiment of the present invention. In FIG. 3, elements similar to those in FIG. 1 have the same reference marks, and the detailed descriptions of these elements are omitted.

The differences in structure between FIG. 3 and FIG. 1 are listed as follows:

(1) Second switching element 13 is made of a rectifier (diode). Thus, control circuit 15 controls the power to be supplied to load 5 by changing on/off ratio D2 of first switching element 11.

(2) Selector switch 17 is eliminated, and switch 31 is provided so that the switch is connected in series with second switching element 13 and switched on when power is supplied to load 5. The on/off control of switch 31 is made by control circuit 15.

(3) Third switching element 33 is provided so that the switching element is connected between first switching element 11 and the negative terminal of DC voltage source 1, repeats switching on/off alternately with first switching element 11, and is normally switched off when power is supplied to load 5.

The structure other than the above is identical with that of the first exemplary embodiment.

Next, a description is provided of the operation of the power supply device structured as above.

First, when the ignition switch (not shown) of a vehicle is turned on, the external ECU transmits a charging signal to control circuit 15 so that auxiliary voltage source 3 is charged. In response to this signal, control circuit 15 switches auxiliary voltage source selector switch 19 to the charge side, and turns off switch 31. Thereafter, control circuit 15 controls first switching element 11 and third switching element 33 so that one of the first and third switching elements is alternately switched on. Thereby, in a manner similar to the first exemplary embodiment, two-way DC/DC converter 29 starts to charge auxiliary voltage source 3 using the power of DC voltage source 1. When the charging makes voltage VC of auxiliary voltage source 3 equal to second predetermined voltage 25 of second error detection amplifier 27, the converter operates to keep the charged voltage.

Next, assume that the starter or another system that consumes large current operates, as load 5. At this time, a discharging signal is transmitted to control circuit 15 from the external ECU. Then, control circuit 15 switches auxiliary voltage source selector switch 19 to the discharge side, and turns on switch 31. Further, third switching element 33 is normally switched off. Thereafter, control circuit 15 makes on/off control on first switching element 11 only. Thus, second switching element 13 made of a rectifier is switched off when first switching element 11 is switched on, and second switching element 13 is switched on when first switching element 11 is switched off. As a result, two-way DC/DC converter 29 outputs a voltage to load 5 so that the voltage is equal to second predetermined voltage 21 of first error detection amplifier 23. Therefore, even when a large current consumption changes voltage VB of DC voltage source 1 from a normal voltage state to a voltage drop state, voltage VL of load 5 is kept substantially equal to the voltage in the normal voltage state. Thus, load 5 can keep normal operation. At this time, VL>VB, and thus diode 7 blocks the power of two-way DC/DC converter 29 from flowing back into DC voltage source 1.

At this time, a change of voltage V1 with time at the junction point between first switching element 11 and second switching element 13 in two-way DC/DC converter 29 is exactly the same as that shown in FIG. 2. Thus, off/off ratio D2 in the second exemplary embodiment is smaller than conventional on/off ratio D. Therefore, the power supply device of the second exemplary embodiment also requires a smaller number of power storage elements in auxiliary voltage source 3, and can be made smaller in size than the conventional structure.

Also in the second exemplary embodiment, the auxiliary voltage source can be made approximately 30% smaller in size than that of the conventional structure, under the same condition of values in the first exemplary embodiment.

In this manner, also in the second exemplary embodiment, power is supplied from the DC voltage source when second switching element 13 is switched on. This structure can reduce the power to be supplied from auxiliary voltage source 3. As a result, this structure can reduce the number of power storage elements and thus the size of the power supply device.

Next, after the completion of the large current consumption, voltage VB of DC voltage source 1 is returned to the normal voltage state. At this time, the external ECU transmits a charging signal to control circuit 15. In response to this signal, control circuit 15 switches auxiliary voltage source selector switch 19 to the charge side and turns off switch 31 so that the power supplied from auxiliary voltage source 3 to load 5 during the large current consumption is recharged to auxiliary voltage source 3. Thus, auxiliary voltage source 3 is fully charged.

In this manner, even when DC voltage source 1 operates to intermittently repeat the normal voltage state and the voltage drop state, repeating the above charge/discharge operations allows the supply of stable voltage to load 5 and the stable operation of load 5.

The above operations are summarized. First, when DC voltage source 1 is in the normal voltage state, DC voltage source 1 supplies power directly to load 5. At the same time, control circuit 15 turns off switch 31, switches auxiliary voltage source selector switch 19 to the side of second error detection amplifier 27, and switches on/off first switching element 11 and third switching element 33 so that one of the first and third switching elements is alternately turned on. Thereby, the power of DC voltage source 1 is charged to auxiliary voltage source 3. Next, when DC voltage source 1 is brought into the voltage drop state by the large current consumption of load 5, control circuit 15 turns on switch 31, and switches on/off first switching element 11 while keeping third switching element 33 normally off. Thereby, power is supplied to load 5. With these operations, even when DC voltage source 1 intermittently repeats the normal voltage state and the voltage drop state, load 5 can keep the stable operation.

In comparison with the first exemplary embodiment, the second exemplary embodiment is structured so that second switching element 13 made of a rectifier, and switch 31 are added, and selector switch 17 is eliminated. Selector switch 17 for use in the first exemplary embodiment is an externally-controllable three-terminal switch. Such a switch formed by combination of semiconductors has a complicated structure. Thus, the second exemplary embodiment, which does not require selector switch 17, can implement a power supply device with a simpler structure.

The above structure and operations can reduce the number of power storage elements in the auxiliary voltage source and thus the size of the power supply device.

In each of the first and second exemplary embodiments, an electric double-layer capacitor is used as a power storage element of auxiliary voltage source 3. Instead, a high-capacity capacitor, such as an electrochemical capacitor, or a secondary battery can be used. However, from the viewpoints of rapid charge/discharge characteristics and reliability, a high-capacity capacitor is more preferable than a secondary battery.

INDUSTRIAL APPLICABILITY

A power supply device of the present invention is capable of supplying a voltage to a load from not only the auxiliary voltage source but also the DC voltage source, even at a voltage drop of the DC voltage source. Thus the present invention is useful as a small power supply device or the like that allows the load to keep stable operation even with a smaller number of power storage elements in the auxiliary voltage source.

The invention claimed is:

1. A power supply device, comprising:
   a direct-current (DC) voltage source;
   an auxiliary voltage source that has one end coupled to a positive terminal of the DC voltage source;
   a load that consumes power;
   an inductance element that has one end coupled to the load;
   a first switching element that is coupled to an other end of the inductance element and to an other end of the auxiliary voltage source, and applies a total voltage of the DC voltage source and the auxiliary voltage source to the inductance element by repeating intermittent switching on/off;
   a second switching element that is coupled to the other end of the inductance element, and applies a voltage of the DC voltage source to the inductance element by repeating intermittent switching on/off alternately with the first switching element so that one of the first switching element and the second switching element is switched on;
   a control circuit that controls power to be supplied to the load by changing the switching on/off ratio between the first switching element and the second switching element; and
   a selector switch that switches coupling of the second switching element to the DC voltage source so that the second switching element is coupled to either of the positive terminal or a negative terminal of the DC voltage source,
   wherein, when the DC voltage source is in a normal voltage state, the DC voltage source supplies power directly to the load and the control circuit switches the selector switch to the negative terminal at the same time, and thereby the power of the DC voltage source is charged to the auxiliary voltage source through the inductance element by switching on/off the first switching element and the second switching element,
   when the DC voltage source is in a voltage drop state, the control circuit switches the selector switch to the positive terminal, and thereby power is supplied to the load through the inductance element by switching on/off the first switching element and the second switching element.

2. A power supply device, comprising:
   a direct-current (DC) voltage source;
   an auxiliary voltage source that has one end coupled to a positive terminal of the DC voltage source;
   a load that consumes power;
   an inductance element that has one end coupled to the load;
   a first switching element that is coupled to an other end of the inductance element and to an other end of the auxiliary voltage source, and applies a total voltage of the DC voltage source and the auxiliary voltage source to the inductance element by repeating intermittent switching on/off;
   a second switching element that is coupled to the other end of the inductance element, and applies a voltage of the DC voltage source to the inductance element by repeating intermittent switching on/off alternately with the first switching element so that one of the first switching element and the second switching element is switched on, the second switching element being made of a rectifier;
   a control circuit that controls power to be supplied to the load by changing the switching on/off ratio of the first switching element only;
   a switch coupled to the second switching element and to the positive terminal of the DC voltage source; and
   a third switching element coupled to the first switching element and to a negative terminal of the DC voltage source,
   wherein, when the DC voltage source is in a normal voltage state, the DC voltage source supplies power directly to the load and the control circuit turns off the switch at the same time, and thereby the power of the DC voltage source is charged to the auxiliary voltage source through the inductance element, the first switching element, and the third switching element that repeats intermittent switching on/off alternately with the first switching element so that one of the first switching element and the third switching element is switched on, when the DC voltage source is in a voltage drop state, the control circuit switches on/off the first switching element while turning on the switch and keeping the third switching element normally off, and thereby power is supplied to the load through the inductance element.

* * * * *